US012737276B2

(12) United States Patent
Gupta et al.

(10) Patent No.: US 12,737,276 B2
(45) Date of Patent: Sep. 15, 2026

(54) MULTI-LAYER INTERACTION AND CODE EXAMINER FOR N-TIER ARCHITECTURE APPLICATIONS

(71) Applicant: VERIZON PATENT AND LICENSING INC., Basking Ridge, NJ (US)

(72) Inventors: Ashish Gupta, Hyder Nagar (IN); Arunkumar Amarnath, Kondapur (IN); Rohit Agrawal, Ranga Reddy Hyderabad (IN); Kanakasubramaniam Krishnamurthi, Saligramam Chennai (IN); Viraj Mantri, Madhpaur (IN); Vasanth Varma, Ranga Reddy Hyderabad (IN); Suresh Gundapaneni, Rajender Nagar (IN); Niranjan Padhi, Kurmanapalem Vizag (IN); Vyjayanthi Venkataraman, Jawahar Nagar (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 267 days.

(21) Appl. No.: 18/231,050

(22) Filed: Aug. 7, 2023

(65) Prior Publication Data

US 2025/0053495 A1 Feb. 13, 2025

(51) Int. Cl.
*G06F 11/3604* (2025.01)
*G06F 16/2455* (2019.01)

(52) U.S. Cl.
CPC ...... *G06F 11/3608* (2013.01); *G06F 16/2455* (2019.01)

(58) Field of Classification Search
CPC ......................... G06F 16/2455; G06F 11/3608
USPC .......................................................... 717/126
See application file for complete search history.

(56) References Cited

U.S. PATENT DOCUMENTS

| | | | | |
|---|---|---|---|---|
| 2017/0192758 | A1* | 7/2017 | Apte | G06F 8/76 |
| 2019/0188579 | A1* | 6/2019 | Manoharan | G06Q 20/4016 |
| 2019/0317743 | A1* | 10/2019 | Cremeans | G06F 8/427 |
| 2020/0349159 | A1* | 11/2020 | Tabb | G06F 16/24537 |
| 2022/0382865 | A1* | 12/2022 | Duplys | G06F 21/554 |
| 2023/0229435 | A1* | 7/2023 | Calahan | G06F 8/71 717/122 |
| 2023/0315412 | A1* | 10/2023 | Singleton | G06F 8/315 717/126 |
| 2025/0021420 | A1* | 1/2025 | Sethi | G06F 11/0781 |

* cited by examiner

*Primary Examiner* — Bradford F Wheaton

(57) ABSTRACT

In some implementations, the techniques described herein relate to a method including: receiving a request from a user to analyze a consumer microservice; retrieving first source code associated with the consumer microservice and second source code associated with a producer microservice; analyzing the first source code to identify issues in the first source code; retrieving log data generated by the consumer microservice; analyzing the first source code, the second source code, and the log data to identify unused fields transmitted by the producer microservice to the consumer microservice; generating a report including the issues and the unused fields; and transmitting the report to the user responsive to the request.

20 Claims, 6 Drawing Sheets

MULTI-LAYER INTERACTION AND CODE EXAMINER FOR N-TIER ARCHITECTURE APPLICATIONS

BACKGROUND

Enterprise-level applications commonly use multi-layer architecture, enabling manageability and scalability through distinct, interacting layers. However, current analysis tools focus on individual layers, often overlooking crucial cross-layer interaction patterns. As these interactions significantly influence the application's overall behavior, these tools fall short of providing comprehensive performance insights. There is a clear need for a holistic code analysis mechanism that can properly account for impacts across multiple application layers.

DETAILED DESCRIPTION

Figure 1:
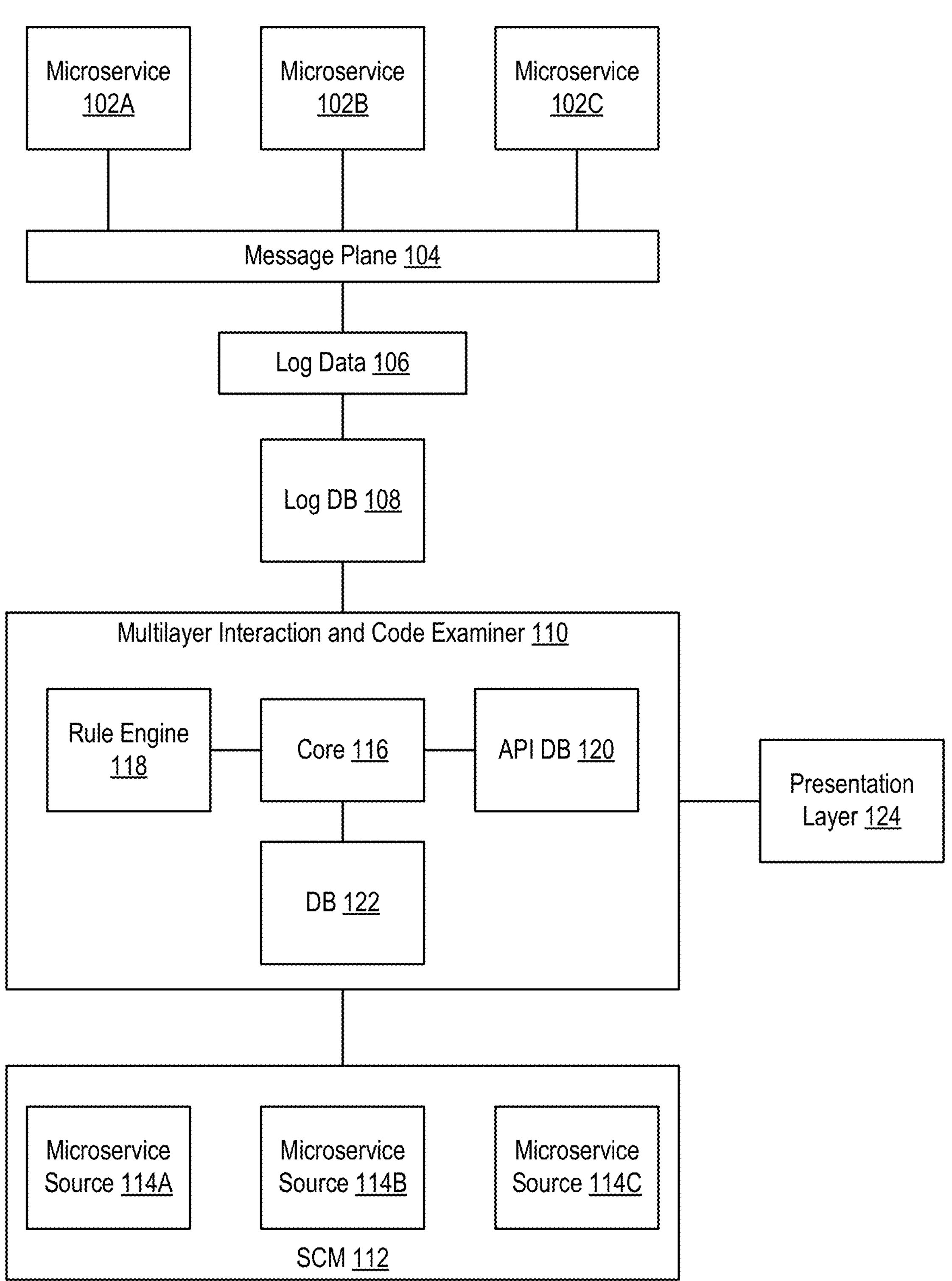
FIG. 1 is a block diagram illustrating a system for performing a cross-layer analysis of an n-tier architecture according to some of the example embodiments.

The example embodiments solve the aforementioned problems, and others, by providing a code and traffic analysis system for n-tier architectures. The example embodiments describe interaction patterns across application layers to ensure cross layer governance, performance, and validation before deployment and during production.

The example embodiments pertain to a cross-layer solution that examines interaction patterns between the layers of an n-tier application, ensuring alignment with governance and architectural practices. The example embodiments integrate and analyze code at various service layers in a multi-layer architecture, analyzing the interaction patterns between these layers and determining how the output from one layer is used in another. This discovery process generates findings which are then measured against enterprise-level governance rules, security standards, and potential performance impacts. Such an approach may automate the entire governance process in a large enterprise, offering visibility to developers early in the development cycle.

Frequently, code repositories like GITHUB® house the code for large enterprise applications, and application logs are maintained in tools like KIBANA®. The example embodiments may scan such code repositories across all layers to discern inter-application dependencies and code constructs and determine how data is generated in one layer and utilized in another. The example embodiments may further examine live logs between various layers to identify data flow during interactions. All these details maybe processed to verify whether a consumer application is requesting only necessary data, if data production and consumption across layers complies with enterprise architecture guardrails, and if data in transit adheres to the organization's security policies. The findings may be shared with developers in a clear, easily understandable format, highlighting areas of concern and suggesting next best actions. The example embodiments can be employed within a continuous deployment/continuous integration (CD/CI) pipeline, thus ensuring regular execution.

In some implementations of the techniques described herein, a user request to analyze a specific consumer microservice is received. The process includes retrieving source code related to the consumer microservice, which may be referred to as the first source code, and source code associated with another microservice it interacts with, known as the producer microservice, which may be referred to as the second source code.

The first source code may then be analyzed to identify any issues present in the first source code. Additionally, log data generated by the consumer microservice may be retrieved for further analysis. Both the first and second source code, as well as the log data, may be analyzed with the aim of identifying any unused fields that the producer microservice transmits to the consumer microservice.

In some implementations, the first source code and the second source code are obtained by issuing a query to a tool managing the source code. A query can also be sent to a rule engine to obtain a list of data necessary for analyzing the first and second source code, as well as the log data.

The analysis of the first source code can include parsing it to identify database queries and any unused database queries present. These identified queries can then be transmitted to a rule engine. This allows for identification of any rules triggered by these queries, which include checks to ensure that only indexed columns are used in queries, that blind Cartesian products are not used, that null checks are performed on non-nullable columns, and that the number of unused queries are kept to a minimum. Furthermore, it may check that all columns in the database queries are utilized and that the queries are authorized for the consumer microservice.

The first source code, the second source code, and the log data can also be analyzed to identify unused fields transmitted from the producer to the consumer microservice. This can include identifying an output data model of the producer microservice from the second source code, identifying a set of fields used by the consumer microservice using the first source code and the log data, and identifying a set of unused fields using the output data model and the set of used fields.

Once all the data is collected and analyzed, a report can be generated which includes the identified issues and unused fields. This report can then be transmitted back to the user in response to their initial request. In some implementations, the identification of errors or other warnings can be used by a downstream system to initiate changes in the code to remedy the error. For example, if the report indicates that some fields of a returned API response are not used, the code may be automatically modified to remove any references to those fields. In some implementations, this code change can be pushed as a new version of the code or may be stored for human review before committing. In some implementations, the report can further be used to transmit a notification or alert to a user. For example, a short message service (SMS) or similar type of notification (e.g., mobile push notification) can be transmitted to one or more users responsible for the code, enabling immediate flagging and triaging of potential issues. In some instances, this process can cause a build or deployment process to fail if it's determined that the report includes one or more issues.

In some implementations, a computer-readable media and device for performing the above method are also described. The following discussion provides further detail on the above-described methods.

FIG. 1 is a block diagram illustrating a system for performing a cross-layer analysis of an n-tier architecture according to some of the example embodiments.

In the illustrated system, a plurality of microservices (microservice 102A, microservice 102B, and microservice 102C) are deployed in an n-tier architecture and are communicatively coupled via message plane 104. The microservices may perform functions defined by their corresponding code bases and may communicate amongst each other via application programming interface (API) calls.

In an n-tier architecture, a client-server design framework, helps distribute the work of the application across several independent layers, improving scalability and manageability. Microservices, each a self-contained process that fulfills a specific function, often align with these layers. Message plane 104 provides the communication backbone for these microservices, facilitating inter-service dialogue and the transmission of data and commands. APIs act as conduits for these microservices, defining the methods and data formats they can use to communicate with each other. This communication is vital for the overall application, enabling it to function as a cohesive unit despite the distributed nature of the microservices.

Microservices are typically implemented using lightweight, language-agnostic frameworks that can be containerized for deployment. Examples of such frameworks include SPRING BOOT® for JAVA®, Express.js for NODE.JS®, or Flask for PYTHON®. They are often deployed using technologies like Docker for containerization and KUBERNETES® for orchestration, providing the ability to scale and manage the microservices across a distributed system seamlessly. Message plane 104 serves as the backbone for microservice communication. It often leverages service mesh technologies, such as ISTIO® or LINKERD®, which provide a dedicated infrastructure layer for handling service-to-service communication. This layer enables capabilities like service discovery, load balancing, traffic management, inter-service authentication, and observability. The microservices communicate with each other by passing messages over message plane 104, usually using standard protocols like HTTP/2, gRPC, or REST, providing interoperability across different services and technologies. Furthermore, APIs used for inter-service communication are typically defined using OPENAPI® specifications or protocol buffers, which provide a standardized and language-agnostic means for defining the service interface. This ensures that microservices, regardless of the programming language they're implemented in, can effectively interact with each other through well-defined contracts.

In some implementations, log data 106 can be generated during the operation of the microservices and stored in log database 108. As illustrated, in some implementations, log data 106 can be extracted from messages transmitted over message plane 104.

As each microservice operates, it can generate log data 106 that captures runtime information, such as the API calls it makes, the responses it receives, the processing time for requests, and any errors or exceptions encountered during operation. The generation of log data 106 can be achieved through various methods. In many microservice frameworks, logging libraries are used to programmatically create log entries at different points within the application code. These libraries can be configured to output logs in structured formats such as JSON or XML, making them easily parsable and analyzable by downstream systems, such as the illustrated multilayer interaction and code examiner (MICE). Beyond the application-specific log data, log data 106 can be extracted from the messages transmitted over the message plane 104. Given that the message plane serves as the communication medium for microservices, it can capture details about the requests and responses exchanged between microservices. Tools like service meshes or API gateways can provide built-in mechanisms to log these details and store the log data 106 in log database 108. Once generated, log data 106 can be stored in a log database 108, such as ELK (ELASTICSEARCH®, LOGSTASH®, AND KIBANA®) stack or a cloud-based solution like AMAZON® CloudWatch where it can be further processed, analyzed, and visualized. These systems can provide querying capabilities for MICE 110.

In an implementation, each microservice is also associated with a corresponding source code repository (microservice source 114A, microservice source 114B, microservice source 114C) which can be managed by a source code management tool such as SCM 112. The source code repositories (microservice source 114A, microservice source 114B, and microservice source 114C) house the source code associated with each corresponding microservice. They store not only the application logic but also configurations, ancillary scripts, and sometimes deployment details. These repositories are managed by a Source Code Management tool (SCM 112), which provides version control functionality, allowing developers to keep track of changes, compare different versions, and roll back if necessary. The SCM, which can be a system like Git, Mercurial, or Subversion, facilitates code sharing and collaboration, particularly in distributed teams.

Source code management tools like SCM 112 often provide APIs, facilitating interaction with the source code repositories. These APIs enable various operations such as code fetching, version comparison, or retrieving metadata about commits. By accessing the repositories programmatically, other systems or components can leverage the source code information without manual intervention. Scenarios such as continuous integration and deployment processes, automated testing, or, as in the present system, in-depth code analysis across different layers of the application can utilize these APIs. Through these APIs, code from each microservice's source repository (microservice source 114A, microservice source 114B, and microservice source 114C) can be retrieved and analyzed as part of the holistic assessment of the multi-layer application.

As illustrated, MICE 110 is communicatively coupled to the log database 108 and SCM 112. MICE 110 includes a core 116, rule engine 118, API database 120, and an analysis database 122. Details of MICE 110 and core 116, rule engine 118, API database 120, and an analysis database 122 are provided in the following interaction diagrams and the function of those components is not repeated herein. In general, MICE 110 (and its components) can be implemented on a general-purpose computer such as a server or desktop computer or can be deployed in a containerized system such as DOCKER® or KUBERNETES® along with the microservices.

Core 116 may comprise an application server or similar device that can receive requests for analysis, coordinate with other components (e.g., rule engine 118, API database 120, analysis database 122, and SCM 112), and provide alerts or other presentation layer data to users via presentation layer 124. For example, core 116 may implement an API that allows a user to request an analysis of a microservice, endpoint, function call, or other portion of an application.

Rule engine 118 may comprise a database that stores rules governing cross-layer and intra-API constraints places on microservices in the system. For example, rule engine 118 may store rules that govern how queries are designed and executed by microservices. Rule engine 118 may also store rules defining how API fields are consumed between consumer and producer microservices. In some implementations, rule engine 118 can store these rules in a configurable data store and thus the rules can be updated as needed. Rule engine 118 may also provide its own API such that core 116 may query the rule engine 118 to obtain a list of required data to execute the rules. For example, rule engine 118 may associate a rule with one or more request items of data. For example, a rule governing how queries are designed may be associated with a required list of query parameters. As will be discussed, core 116 may use this requirement to analyze source code and/or traffic logs and return the necessary data to rule engine 118, such that the rule engine 118 can then execute the rules on the returned data.

API database 120 may store metadata representing a database. For example, API database 120 may store metadata describing tables, columns, indexes, and other properties of a database. In some implementations, API database 120 may be implemented as part of the database itself. In other implementations, the API database 120 may be implemented separately from the database or databases. API database 120 may also provide an API such that core 116 can query API database 120 to obtain metadata describing the database(s).

Analysis database 122 may comprise a general-purpose database that can store the results of the processing performed by core 116. In some implementations, analysis database 122 can be used as a temporary storage location when presenting results of the analysis via presentation layer 124. In some implementations, analysis database 122 can also maintain a record of issues detected and whether such issues are resolved, allowing for issue tracking using the analysis of core 116.

MICE 110 provides interactive functionality via a presentation layer 124. In some implementations, this presentation layer 124 can take the form of a mobile application, desktop application, web application, etc. In some implementations, presentation layer 124 can allow a developer to inspect the cross-layer governance of any microservice either ad hoc or response to events such as builds or deployments (discussed in more detail in FIG. 5). In some implementations, presentation layer 124 can also output reports, visualizations, or alerts to a developer when issues are detected by MICE 110 (discussed in the following figures).

Figure 2:
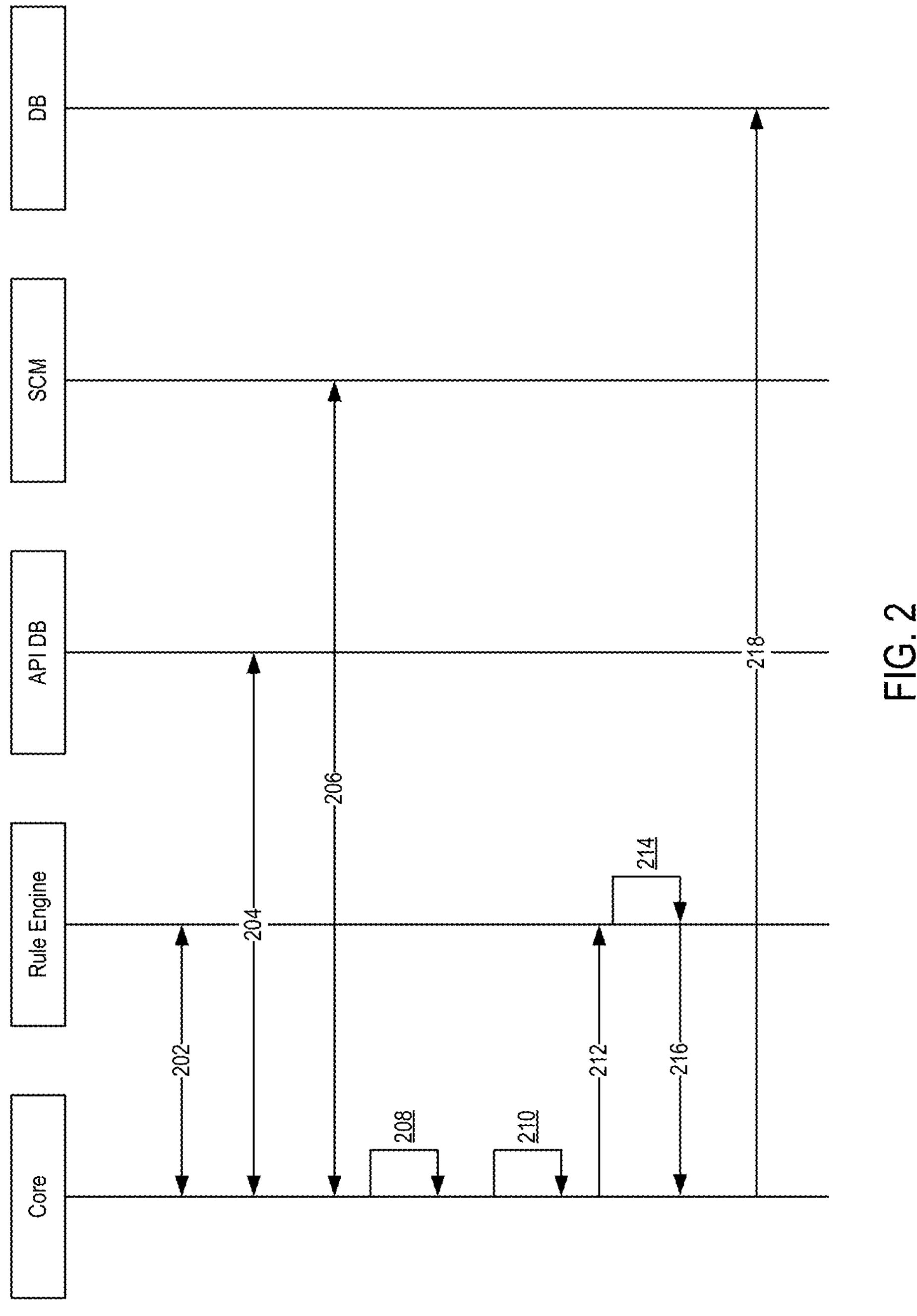
FIG. 2 is an interaction diagram illustrating a method for performing an internal analysis of a microservice according to some of the example embodiments.

FIG. 2 is an interaction diagram illustrating a method for performing an internal analysis of a microservice according to some of the example embodiments. In some implementations, the method of FIG. 2 analyzes database queries of a microservice and determines if there are, for example, unused queries or unwanted query parameters.

In step 202, the core issues a query to the rule engine to identify the data required for analysis. In some implementations, step 202 can be triggered via an API call that requests intra-API analysis of a given microservice. In some implementations, the request may include an analysis type of intra-API analysis. In this type of analysis, the core will ultimately analyze the source code of a microservice and its queries to a database. In response, the rule engine returns a serialized data structure that defines the required fields required to complete the analysis (i.e., the fields required to execute the rules).

This querying process is generally facilitated through a request-response interaction between the core and the rule engine. The query from the core could be formulated based on the specifications provided by the user through an API call. This request might also contain identifiers for the particular microservice that is targeted for the intra-API analysis, ensuring the analysis is appropriately focused.

The rule engine, in response, generates a serialized data structure. This data structure essentially outlines the necessary parameters or fields that are critical for the analysis process. These fields might include specific function names, variable identifiers, or other relevant code structures present in the microservice source code, based on the rules that will be applied during the analysis. The returned data structure can be tailored to encapsulate all the information required for the rule-based assessment of the source code, helping to streamline the subsequent stages of the analysis.

In step 204, the core next queries the API database to obtain metadata of the database. In some implementations, the query can request all metadata of the database. In other implementations, a filter can be applied such that the query only requires a limited subset of the database. In response, the API database returns metadata of the database to the core. In some implementations, the metadata can comprise table metadata, index metadata, key metadata, column metadata, etc.

The querying process for metadata is initiated by the core, which can formulate the query based on the analysis requirements, the metadata elements available, or other context-specific information. The core can create and send a general query to fetch all available metadata, or a more specific one, applying filters to restrict the data retrieved to only the most pertinent subset. This filtering can be useful in managing large databases where fetching all metadata could be resource-intensive and unnecessary.

The metadata provided by the API database includes key information such as table structures, indexed fields, unique keys, and column details. This information can aid in understanding the database schema, relationships among different tables, and how data is stored and accessed.

In some implementations, the core doesn't need access to the source or direct database access to retrieve this metadata. This could be fetched using globally configured rules or settings that are based on specific identifiers tied to the microservice, like a microservice ID or details obtained from the KUBERNETES® configuration. This ensures that the core receives the necessary metadata without needing comprehensive access rights, which enhances the security and integrity of the system.

In step 206, the core queries the SCM to obtain the source code for the microservice subject to analysis. In response, the SCM returns the source code, or a link to the source code, for the microservice.

When the core initiates the query to the SCM, it does so to procure the source code associated with the specific microservice being analyzed. This request to the SCM could include identifiers such as the microservice's name, its version number, or other distinguishing metadata. Upon receiving the query, the SCM processes it and locates the requested source code within its repositories. Instead of transmitting the entire code base, which might be extensive and data-intensive, the SCM can opt to provide a reference to the code, often in the form of a URL or a specific path within the repository. This link directs the core to the location of the relevant source code within the SCM system. By doing so, the system saves on transmission time and data, while ensuring that the core has access to the most current version of the source code. Such SCM systems are often hosted on cloud platforms and follow the Saas (Software as a Service) model, enhancing accessibility and ease of integration with other parts of the system like the core.

In the source code retrieval process, the SCM could house code written in a variety of programming languages. The choice of language typically depends on the specific requirements of the microservice and the technological stack of the enterprise. For instance, JAVA® might be used. However, other languages like PYTHON® or JAVASCRIPT® might also be employed. Regardless of the language, the source code retrieval process remains the same, with the core interacting with the SCM to obtain the necessary code.

In step 208, the core parses the source code and identifies all database queries present in the source code.

Parsing the source code to identify all database queries can include scanning and interpreting the code to extract specific syntactic patterns that represent these queries. Given the multilingual nature of most SCMs, the parsing tool may be language-agnostic, or equipped with modules for handling different programming languages. For instance, if the source code is written in JAVA®, the parser can search for instances of Java Database Connectivity (JDBC) API calls, JPA or Hibernate queries which are commonly used to interact with databases. Alternatively, or in conjunction with the foregoing, database queries, usually represented as strings within the source code, follow distinct structural patterns depending on the type of database in use and the query language applied, usually structured query language (SQL) or a variant thereof. A parser can identify these patterns, such as SELECT, INSERT, UPDATE, DELETE commands in SQL, as well as the specific tables and fields they refer to. Once the queries are identified, they can be extracted for further analysis. This extraction includes not only the query command itself, but also its context, such as the function or method it's used in, parameters passed into it, and even the conditionals or loops surrounding its execution.

As an example, consider a microservice that uses the JAVA® Hibernate framework to aid in the mapping of an object-oriented domain model to a relational database. Such a microservice source may include the following JAVA® code:

```
String hql = "FROM Employee E WHERE E.id = :employee_id";
Query query = session.createQuery(hql);
query.setParameter("employee_id", 10);
List results = query.list( );
```

In this example, a database query is formulated as a Hibernate Query Language (HQL) string FROM Employee E WHERE E.id=: employee_id, and then executed against the database using a Hibernate Session.

During the parsing phase, the parser can identify the line String hql="FROM Employee E WHERE E.id=: employee_id"; as a database query. It may be determined that this line contains a query because it matches a format of an expected query language and it is assigned to the hql variable which is later used in session.createQuery(hql). The parser can then extract the query for further analysis, in this case, FROM Employee E WHERE E.id=:employee_id. This query is selecting all fields from the Employee table where the id equals a specific value. The specific value (:employee_id) is set as a parameter in the next line query.setParameter("employee_id", 10), making it a parameterized query. In some implementations, the parser can also take retrieve the context of the query. For instance, this query might be embedded in a method that fetches an employee's data by their ID. Such context may be used for understanding the intent behind the query and evaluating its appropriateness and efficiency.

In step 210, the core next continues parsing the source code and also identify any unused database queries present in the source code.

In some implementations, unused database queries are queries that, despite being present in the source code, are never actually executed in the running application. They might be remnants of older versions of the software, or they may be queries that are written for future use but are currently idle. In a typical source code base, especially a large one, unused queries can exist in various forms. For example, a query could be part of a function or method that is never called or is commented out. Alternatively, a query could be conditionally executed depending on specific runtime circumstances that rarely occur or do not occur at all in the current application context.

To identify unused database queries, the parser can perform a static code analysis to trace the path of each query. It could check if a query's parent function or method is called within the application. If the parser cannot find any calls to that function or method, it implies that the query within is not being used. However, static analysis might not catch all unused queries. For example, some queries might be located within rarely used logic branches or in functions that are invoked in response to rare events. To address this, the core may also employ dynamic analysis techniques, which involves running the application and observing which queries are executed in practice. This kind of analysis requires access to application logs or runtime monitoring data, which can provide insight into the code paths that are commonly executed. Through a combination of static and dynamic analysis, the core can thoroughly examine the source code of a microservice and identify unused database queries. Generally, unused queries are not necessarily problematic, but they can contribute to code bloat and may mislead developers. If such queries access sensitive data or perform write operations, they could also represent a security risk if they are accidentally activated in the future.

In step 212, the core transmits the identified database queries, the unused database queries, and the database metadata to the rule engine. This transmission could occur via an API call, an internal system message, or other means of inter-component communication.

In step 214, the rule engine applies one or more rules to the data received from the core and, in step 216, returns a discrepancy report that indicates potential issues with the microservice. The number of rules is not limited, and the following are examples of rules that may be applied.

In some implementations, the rules can include a rule that ensures that queries are only performed on indexed columns. In some implementations, this rule involves analyzing the query syntax from the source code to identify the targeted columns and cross-referencing them with the metadata retrieved from the API database, which provides information on which columns are indexed. If non-indexed columns are targeted, the rule is triggered.

In some implementations, the rules can include a rule that no blind Cartesian products are used. In some implementations, the rule engine analyzes the database queries to identify if any database queries generate Cartesian products. Typically, Cartesian products occur when a join operation in the query doesn't specify a proper condition, causing all rows of one table to be paired with all rows of another. If such patterns are detected, the rule is triggered.

In some implementations, the rules can include a rule that ensures that null checks are performed on non-nullable columns. In some implementations, this rule can identify queries and code snippets that interact with non-nullable columns and verify the existence of necessary null-checks. If such checks are not found, the rule is triggered.

In some implementations, the rules can include a rule that ensures that no unused queries are present. In this rule, the rule engine can determine if the core returned any unused queries. If so, the rule is triggered.

In some implementations, the rules can include a rule that all columns in a query should be used by the source code. In some implementations, this rule checks that every column referred to in a database query is also utilized in the source code. It involves examining the queries in the code, identifying the columns they reference, and then checking if these columns are used elsewhere in the codebase. If any column is not used, the rule triggers a discrepancy, indicating potential inefficiencies or redundant data retrieval.

In some implementations, the rules can include a rule that the queries only access tables authorized for the microservice. This rule ensures that each microservice only queries tables it is permitted to access. This can be implemented by defining access permissions for each microservice at a table level and comparing these permissions with the tables targeted in the code's database queries. If a query targets a table outside of its defined permissions, the rule is triggered, signaling a potential access control issue.

In some implementations, the rules can include rules that are specific to the database being used. Database-specific rules take into account the unique properties and constraints of the particular database management system in use. These rules could govern aspects like specific syntax, functionalities, or limitations unique to the database. For instance, a rule for an ORACLE® database might check for the use of specific SQL functions, or a MONGODB® rule might enforce the use of specific NoSQL data structures.

In some implementations, the result of running the rules is a list of potential issues or discrepancies that represent logical errors in the microservice's access to and use of the database. In response, the rule engine can package these rules into a serialized format and return the report to the core in step 216.

In step 218, after receiving the report, the core can store the results in the analysis database. As discussed, in some implementations, the core can then report the results in a suitable format (e.g., web page, API response, etc.) to a user that issued the request in step 202.

Figure 3:
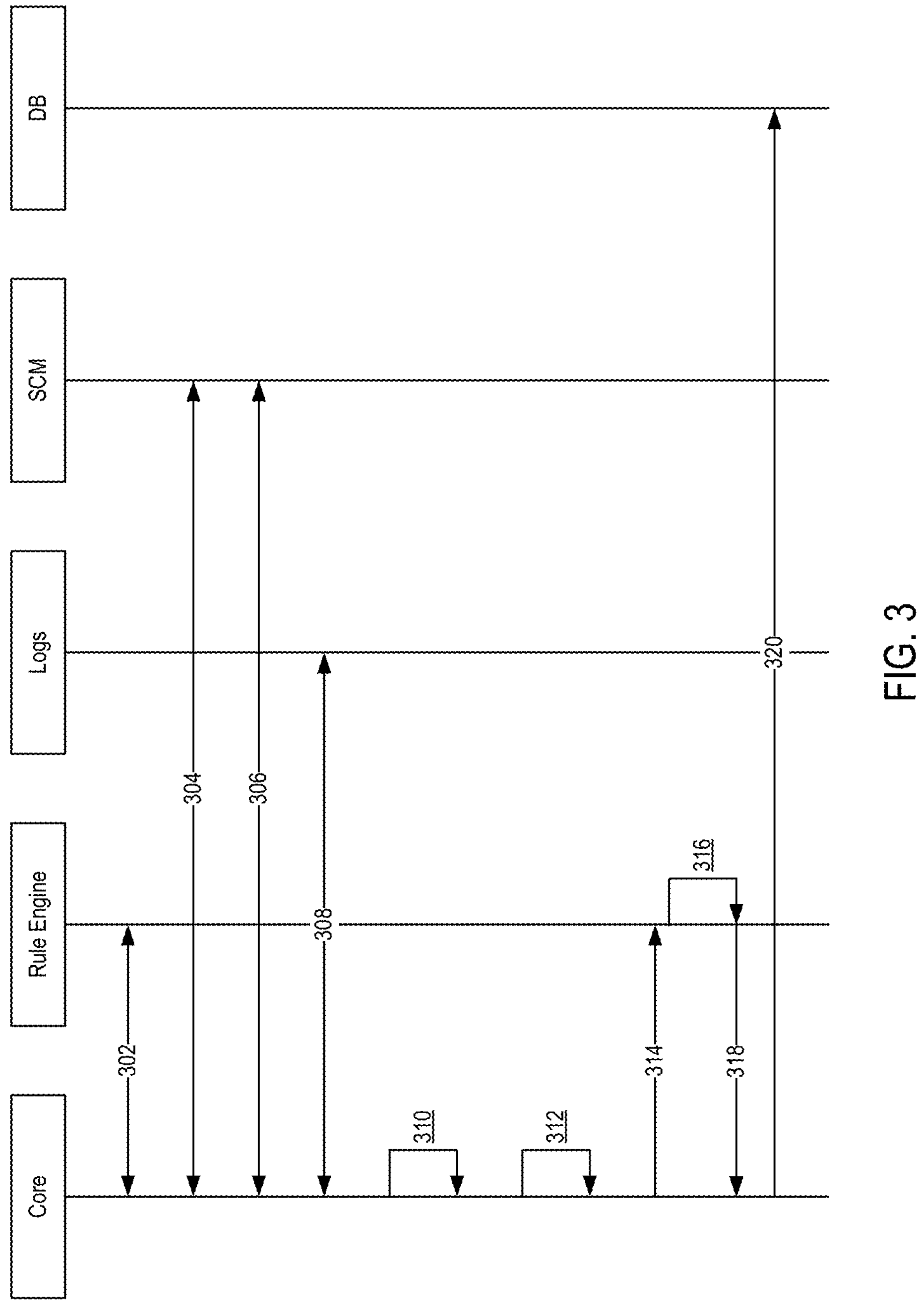
FIG. 3 is an interaction diagram illustrating a method for performing an external analysis of a microservice according to some of the example embodiments.

FIG. 3 is an interaction diagram illustrating a method for performing an external analysis of a microservice according to some of the example embodiments. In some implementations, the method of FIG. 3 analyzes inter-API interaction, e.g., analyzing the outbound calls of a microservice and determining if the microservice is consuming all the fields coming in the response from a producer.

In step 302, the core issues a query to the rule engine to identify the data required for analysis. Details of this step are provided in step 202 which is not repeated but is incorporated by reference in its entirety.

In step 304, the core queries the SCM to obtain the source code of one or more producer microservices, a producer microservice comprising a microservice that the microservice being analyzed accesses. In response, the SCM provides the source of the producer microservice(s). Similarly, in step 306, the core queries the SCM to obtain the source code of a consumer microservice. In some implementations, the consumer microservice comprises the microservice being analyzed. Details of these steps are provided in step 206 in terms of the structure and functions of the SCM and those details are not repeated herein.

In some implementations, identification of the producer microservices can be achieved by examining the communication pattern within the application architecture. More specifically, an analysis of the consumer microservice's source code can reveal the external endpoints it interacts with, and these endpoints can help identify the producer microservices. In a containerized environment like Kubernetes, network interactions between different microservices are logged. By analyzing these logs, the method can identify which microservices are talking to each other, helping to pinpoint producer-consumer relationships. Furthermore, within the source code, specific library calls or functions used for inter-service communication may provide further clues to the producer microservices. In some implementations, it's also possible to leverage application-specific configurations and service discovery mechanisms. Some systems may include metadata about service relationships in configuration files or service registry, which can be utilized to map the interactions between different microservices.

In step 308, the core queries the log database for logs of the microservice being analyzed. In some implementations, these logs comprise network interactions between the consumer microservice and the one or more producer microservices. In some implementations, the core could utilize an API provided by the log database, employing a query language compatible with the log database, such as SQL for relational databases or a specific query language for NoSQL databases like MONGODB® or ELASTICSEARCH®. These queries could involve filtering based on timestamps to analyze recent interactions, or specific IP addresses or service identifiers to isolate the interactions between the consumer microservice and the producer microservices. In environments with high log volume, a well-optimized, indexed log database or an incremental analysis approach can be used for performance reasons.

In step 310, the core can parse the producer microservice source code to identify an output data model of every endpoint and any filters associated with the endpoint.

In some implementations, the core can analyze the producer microservice's source code, looking specifically at its API definitions to identify the output data model for each endpoint. In the context of microservices and APIs, an endpoint refers to a URI (Uniform Resource Identifier) where an API can be accessed by a consumer microservice. Each endpoint represents a specific function of the API, such as retrieving data, updating data, or performing some kind of operation.

The output data model defines the structure and data types of the response that an API endpoint returns when called. For example, in a RESTful API written in the SPRING® Framework for JAVA®, this could mean analyzing the @RestController classes to identify methods annotated with @RequestMapping or @GetMapping, @PostMapping, etc., and examining the return types of these methods. The core also identifies any filters associated with each endpoint. In an API, a filter is a component or process that can intercept a request or response for transformation, logging, security checks, and so on. For example, in a SPRING®-based JAVA® API, these could be represented by methods or classes annotated with @Filter and could be used to manipulate the response data or handle access control before the response is sent to the consumer microservice.

By understanding the producer's output data model and filters, the core can better analyze whether the consumer microservice correctly and efficiently handles the data it receives, as will be discussed next. As discussed previously, step 310 can be performed for each producer microservice source code.

In step 312, the core next analyzes the consumer microservice source code to identify an outbound payload and identify the producer data model fields that the source code uses after getting a response (e.g., HTTP response) from the producer microservice.

In some implementations, the core can analyze the source code of the consumer microservice to determine the structure of the outbound payload relative to a producer microservice. This outbound payload pertains to the data which is being sent from the consumer microservice to the relevant producer microservice during an API request. These requests could be of different types like GET, POST, PUT, DELETE, etc. when using Hypertext Transfer Protocol (HTTP).

In some implementations, the core also identifies which fields of the producer's data model are being used by the consumer microservice. This involves tracking how the response from the producer microservice (e.g., an HTTP response) is being parsed and what data is extracted from it. It examines which fields of the response are being accessed and used in the further logic of the consumer microservice. This could involve checking variable assignments, function calls, or data manipulation procedures in the consumer's source code that involve these fields.

Consider an example where the consumer microservice sends a GET request to the producer microservice to fetch user profile information. The outbound payload in this case could be a JSON object that contains the user ID, like:

```
{
  "userID": "12345"
}
```

Upon receiving a response from the producer microservice, the consumer microservice source code may include source code to handle the response data. If the producer's data model for a user profile response contains fields like 'firstName', 'lastName', 'email', 'address', etc., the consumer microservice might only be using 'firstName' and 'email' in its subsequent logic. The core would identify these accessed fields by analyzing the source code itself.

For instance, the consumer microservice source code (in JAVA®) may be:

```
HttpResponse<String> response = client.send(request,
HttpResponse.BodyHandlers.ofString( ));
JSONObject responseObject = new JSONObject(response.body( ));
String firstName = responseObject.getString("firstName");
String email = responseObject.getString("email");
use(firstName, email); // pseudo code for using fields...
```

In this example, the source code retrieves 'firstName' and 'email' from the response (ignoring other fields in the producer's data model), and these would be recognized by the core as the fields being used from the producer's data model.

In certain implementations, the analysis of the log data from the microservice, also referred to as the outbound payload, plays a role in identifying fields transmitted over the network. Since the outbound payload contains a record of actual transmitted data, it offers a real-world view of the data usage as compared to the static analysis of source code. Source code analysis might not capture all potential pathways of data flow, especially in cases where data is dynamically generated or manipulated. By examining the outbound payload, the core can precisely identify what fields are sent in network requests, including fields that might be added or altered due to runtime conditions or exceptional cases. This real-time data can significantly improve the accuracy and comprehensiveness of the microservice analysis, ensuring that all aspects of data transmission and usage are accounted for. Ultimately, the source code-based fields and log-based fields can be deduplicated and combined to form a single set of fields used.

In step 314, the core transmits the producer microservices' output data model fields and the actual fields used by the consumer microservice to the rule engine.

In step 316, the rule engine uses the received output data model and actual fields used to determine if the consumer is requesting more fields than it uses. If so, the rule engine flags the microservice and (optionally) the unused fields as problematic.

In some implementations, as part of step 316, the rule engine can further recommend one or more filters to be used by the producer and/or consumer microservice to avoid unused fields. These filters can be applied at the source, such as at the producer's data generation point or at the consumer's data reception point, to selectively include only the necessary fields in the API response. This would involve the generation of new source code or modification of existing code, to efficiently discard fields that are not needed, thus reducing unnecessary data flow, enhancing performance, and contributing to a more streamlined data usage strategy.

In some implementations, the result of running the rule engine is a list of unused fields and a set of proposed filters or other code changes. In response, the rule engine can package this data into a serialized format and return a report to the core in step 318.

In step 320, after receiving the report, the core can store the results in the analysis database. As discussed, in some implementations, the core can then report the results in a suitable format (e.g., web page, API response, etc.) to a user that issued the request in step 302.

Figure 4:
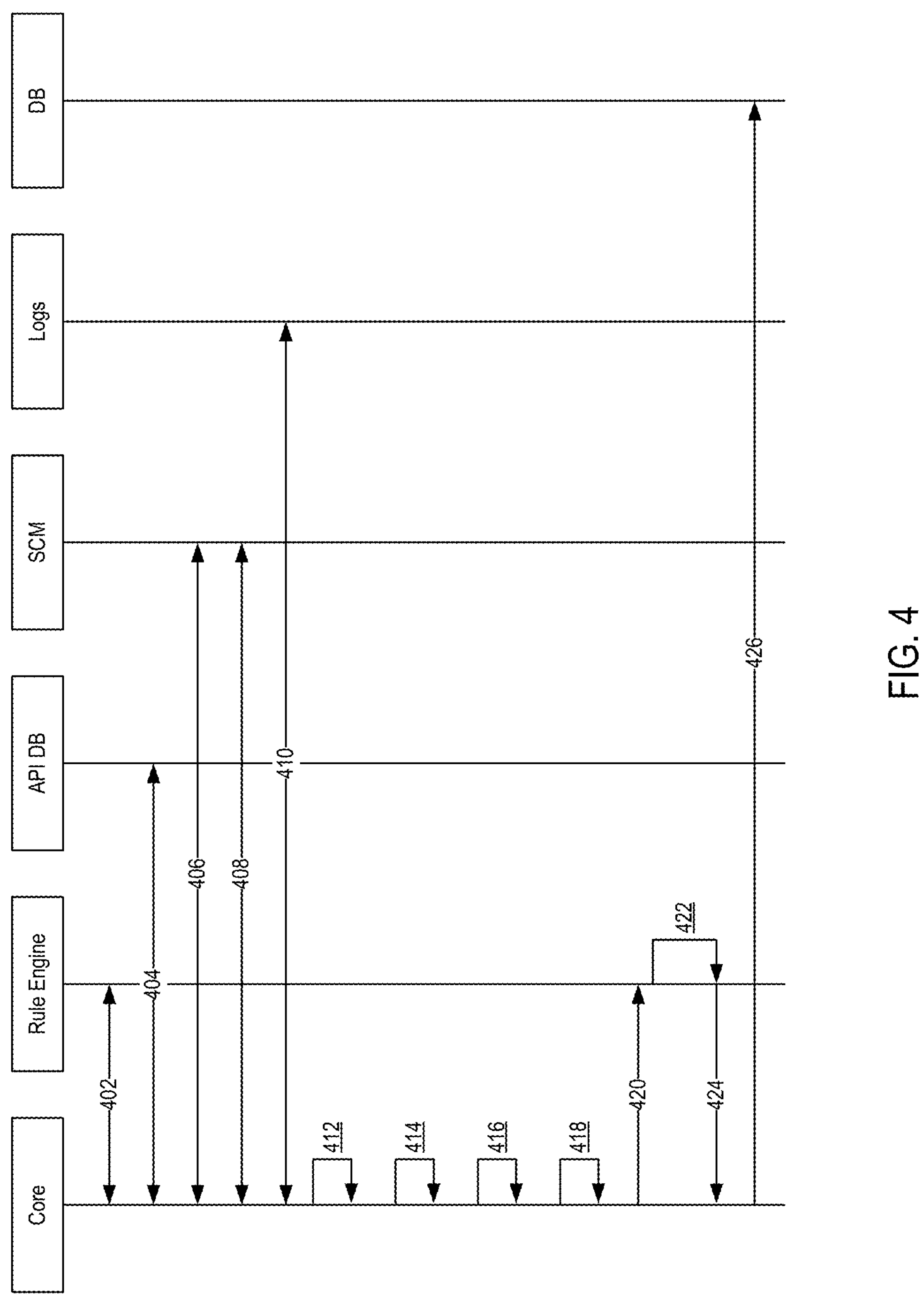
FIG. 4 is an interaction diagram illustrating a method for performing an internal and external analysis of a microservice according to some of the example embodiments.

FIG. 4 is an interaction diagram illustrating a method for performing an internal and external analysis of a microservice according to some of the example embodiments.

In some implementations, the method illustrated in FIG. 4 combines the methods of FIGS. 2 and 3 and reference to the specific steps or interactions are included and the discussion not repeated herein. In some implementations, the method of FIG. 2 can be performed at any time in a microservice's lifetime since it relies primarily on the source code of the microservice. By contrast, in some implementations, the method of FIG. 3 may require a consumer microservice be deployed before it can be analyzed (such that logs are generated). In some implementations, the deployment can be performed in a test or development environment to avoid negatively impacting a production cluster. In any event, the method of FIG. 4 may likewise be deployed after log data is generated.

In step 402, the core issues a query to the rule engine to identify the data required for analysis. In some implementations, step 402 can combine the requests and responses described in step 202 and step 302. That is, step 402 includes querying the rule engine for data required for both the intra-API and inter-API analysis.

In step 404, the core next queries the API database to obtain metadata of the database. This step may include the operations described in step 204. In brief, the method obtains the database metadata required to analyze the source code of the consumer microservice.

In step 406, the core queries the SCM to obtain the source code of one or more producer microservices, a producer microservice comprising a microservice that the microservice being analyzed accesses. In response, the SCM provides the source of the producer microservice(s). Similarly, in step 408, the core queries the SCM to obtain the source code of a consumer microservice. Details of this process are described in step 304 and step 306 of FIG. 3.

In step 410, the core queries the log database for logs of the microservice being analyzed. Details of this step are provided in the discussion of step 308. After obtaining the database metadata, consumer and producer source code, and log data, the core performs a series of analyzes.

First, in step 412, the core parses the source code and identifies all database queries present in the source code. Details of this step are provided in the description of step 208. Second, in step 414, the core continues parsing the source code and also identify any unused database queries present in the source code. Details of this step are provided in the description of step 210. Third, in step 416, the core can parse the producer microservice source code to identify an output data model of every endpoint and any filters associated with the endpoint. Details of this step are provided in the description of step 310. Fourth, in step 418, the core next analyzes the consumer microservice source code to identify an outbound payload and identify the producer data model fields that the source code uses after getting a response (e.g., HTTP response) from the producer microservice. Details of this step are provided in the description of step 312. In some implementations, the order of step 412 through step 418 can vary and the specific ordering illustrated in FIG. 4 is not limiting. Reference is made to the discussion of step 208 and step 210 of FIG. 2 and step 310 and step 312 of FIG. 3 for specific details on these steps.

In step 420, the core transmits the identified database queries, the unused database queries, the database metadata, the producer microservices' output data model fields and the actual fields used by the consumer microservice to the rule engine. This transmission could occur via an API call, an internal system message, or other means of inter-component communication.

In step 422, the rule engine applies one or more rules to the data received from the core and, in step 424, returns a report that indicates potential issues with the microservice. In some implementations, step 422 can include all operations described in step 214 of FIG. 2 and step 316 of FIG. 3, the discussion of which is incorporated herein by reference in its entirety.

In step 426, after receiving the report, the core can store the results in the analysis database. As discussed, in some implementations, the core can then report the results in a suitable format (e.g., web page, API response, etc.) to a user that issued the request in step 402.

Figure 5:
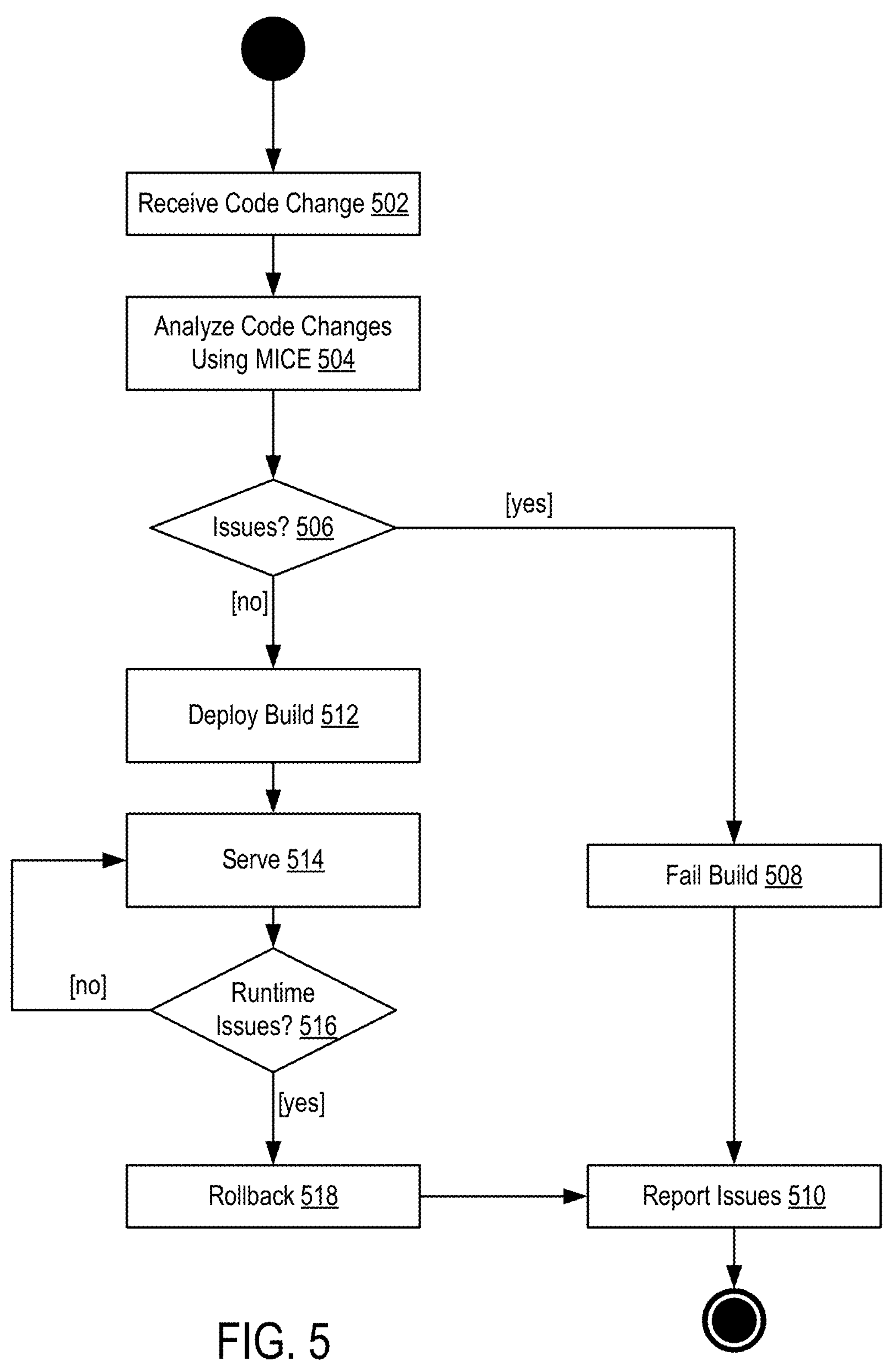
FIG. 5 is a flow diagram illustrating a method for analyzing a codebase before deployment and during production according to some of the example embodiments.

FIG. 5 is a flow diagram illustrating a method for analyzing a codebase before deployment and during production according to some of the example embodiments.

In step 502, the method can include receiving a code change. In some implementations, this code change can comprise a commit to a version controlled codebase (e.g., a git-controlled codebase). In some implementations, the code change can be received as part of a CI/CD pipeline and thus triggered on every commit to the code repository for a microservice to analyze (the "consumer microservice").

In step 504, the method can include analyzing the code changes using MICE. In some implementations, step 504 can include executing the method described with respect to FIG. 2, the details of which are not repeated herein. In summary, step 504 can include generating a report of intra-API issues detected in the codebase (i.e., the output in step 218 of FIG. 2).

In step 506, the method can include determining if any issues were generated during the execution of step 504. If any issues were detected, in some implementations, the method can fail a build and/or deployment process in step 508. In some implementations, this can include preventing the consumer microservice from being built and/or being deployed to a production cluster. In some implementations, this can be implemented as a hook in the CI/CD pipeline which the report triggers, causing a failing build. Further, in some implementations, in step 510, the method can include reporting the issues detected in step 504. In some implementations, the method can include transmitting a notification to a developer or team (e.g., via email) listing the reported issues detected using MICE.

In some implementations, step 510 can further include using the identification of errors or other warnings to initiate changes in the code to remedy the error. For example, if the report indicates that some fields of a returned API response are not used, the code may be automatically modified to remove any references to those fields. Alternatively, if the report indicates that the code is not properly accessing a database, the method can include automatically changing the flagged database call to conform with the rules. In some implementations, the method can use a rule-based system to make changes to the code. In other implementations, a large language model (LLM) or a similar type of machine learning system can be used to suggest changes. For example, the identified line of code triggering a rule can be provided along with the rule triggered to an LLM via a prompt that requests a change to the code to conform with the rule. In some implementations, code changes can be pushed as a new version of the code or may be stored for human review before committing. In this manner, the system can be used to "self-heal" the code based on the triggered rules either prior to deploying or during production.

In some implementations, the report can further be used to transmit a notification or alert to a user. For example, a short message service (SMS) or similar type of notification (e.g., mobile push notification) can be transmitted to one or more users responsible for the code, enabling immediate flagging and triaging of potential issues. In this manner, the method can alert not only the user attempting to deploy code but an entire team of developers to enable a rapid response to fix issues in any given commit (or deployment).

Alternatively, if MICE does not identify any actionable intra-API issues in step 506, the method can proceed to step 512 where the build of the microservice is completed and the microservice is deployed. In some implementations, the microservice can be deployed to production although, in other implementations, the microservice can be deployed to a testing, development, or staging environment where producer microservices are deployed but any issues will not impact production customers.

In step 514, the method can include serving traffic using the consumer microservice. As part of step 514, the method can receive requests from other microservices or users, perform database operations, issue requests to producer microservices, and return data to calling devices. During these operations, log data will be generated as discussed previously.

In step 516, the method can include determining if any runtime issues exist by executing the method of FIG. 3, the details of which are not repeated herein. In some implementations, step 516 can be executed periodically to allow for a build up of log data for the consumer microservice. If no issues are detected, the method can continue to serve requests using the consumer microservice.

However, if the method detects issues reported from MICE (e.g., unused fields) using the method of FIG. 3, the method can proceed to step 518 where the consumer microservice can be rolled back to a prior state. In some implementations, the method can use version control to rollback the code change in step 502 to a previous version or commit of the consumer microservice and then re-deploy the older version of the consumer microservice. In this manner, a previous "safe" state of the consumer microservice can be automatically re-deployed with minimal impact to other microservices. Finally, as discussed, the method can report any issues detected my MICE during runtime in step 510.

Figure 6:
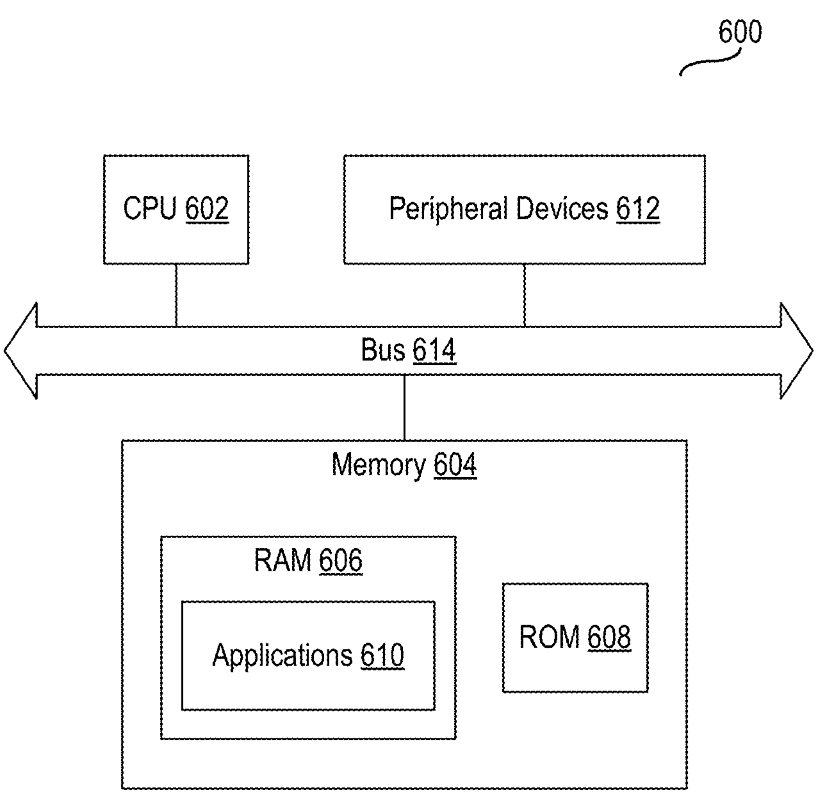
FIG. 6 is a block diagram of a computing device according to some embodiments of the disclosure.

FIG. 6 is a block diagram of a computing device according to some embodiments of the disclosure.

As illustrated, the device 600 includes a processor or central processing unit (CPU) such as CPU 602 in communication with a memory 604 via a bus 614. The device also includes one or more input/output (I/O) or peripheral devices 612. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 602 may comprise a general-purpose CPU. The CPU 602 may comprise a single-core or multiple-core CPU. The CPU 602 may comprise a system-on-a-chip (SoC) or a similar embedded system. In some embodiments, a graphics processing unit (GPU) may be used in place of, or in combination with, a CPU 602. Memory 604 may comprise a memory system including a dynamic random-access memory (DRAM), static random-access memory (SRAM), Flash (e.g., NAND Flash), or combinations thereof. In one embodiment, the bus 614 may comprise a Peripheral Component Interconnect Express (PCIe) bus. In some embodiments, the bus 614 may comprise multiple busses instead of a single bus.

Memory 604 illustrates an example of a non-transitory computer storage media for the storage of information such as computer-readable instructions, data structures, program modules, or other data. Memory 604 can store a basic input/output system (BIOS) in read-only memory (ROM), such as ROM 608 for controlling the low-level operation of the device. The memory can also store an operating system in random-access memory (RAM) for controlling the operation of the device.

Applications 610 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 606 by CPU 602. CPU 602 may then read the software or data from RAM 606, process them, and store them in RAM 606 again.

The device may optionally communicate with a base station (not shown) or directly with another computing device. One or more network interfaces in peripheral devices 612 are sometimes referred to as a transceiver, transceiving device, or network interface card (NIC).

An audio interface in peripheral devices 612 produces and receives audio signals such as the sound of a human voice. For example, an audio interface may be coupled to a speaker and microphone (not shown) to enable telecommunication with others or generate an audio acknowledgment for some action. Displays in peripheral devices 612 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 612 may comprise any input device arranged to receive input from a user. An illuminator in peripheral devices 612 may provide a status indication or provide light. The device can also comprise an input/output interface in peripheral devices 612 for communication with external devices, using communication technologies, such as USB, infrared, Bluetooth®, or the like. A haptic interface in peripheral devices 612 provides tactile feedback to a user of the client device.

A GPS receiver in peripheral devices 612 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

receiving a request to analyze a consumer microservice;

retrieving first source code associated with the consumer microservice and second source code associated with a producer microservice;

analyzing, during production, the first source code to identify issues in the first source code;

retrieving log data generated by the consumer microservice, the log data comprising API responses transmitted from the producer microservice to the consumer microservice;

analyzing the first source code, the second source code, and the log data to identify unused fields transmitted by the producer microservice to the consumer microservice, the analyzing comprising:

parsing API definitions in the second source code to identify an output data model of one or more API endpoints of the producer microservice, the output data model defining fields returned by each API endpoint;

identifying a set of fields used by the consumer microservice by parsing the first source code to determine which fields of the output data model are accessed by the consumer microservice after receiving an API response from the producer microservice and correlating the parsed first source code with the log data; and comparing the output data model with the set of fields used by the consumer microservice to identify a set of unused fields;

automatically modifying the first source code of the consumer microservice to remove the references of the unused fields in response to the issues;

generating a report including the issues and the unused fields; and causing one of a build or deployment process to fail in response to determining that the report includes one or more issues.

2. The method of claim 1, wherein retrieving the first source code and retrieving the second source code comprise issuing a query to a source code management tool and receiving the first source code and the second source code from the source code management tool.

3. The method of claim 1, further comprising issuing a query to a rule engine to obtain a list of data needed to analyze the first source code, the second source code, and the log data.

4. The method of claim 1, wherein analyzing the first source code to identify issues in the first source code comprises parsing the first source code to identify database queries and unused database queries in the first source code.

5. The method of claim 4, wherein analyzing the first source code to identify issues in the first source code comprises transmitting the database queries and the unused database queries to a rule engine.

6. The method of claim 5, wherein analyzing the first source code to identify issues in the first source code comprises identifying one or more rules triggered by the database queries and the unused database queries, the one or more rules including:

checking that queries only use indexed columns;

checking that queries do not use blind Cartesian products;

checking that queries perform null checks on non-nullable columns;

checking a number of the unused queries;

checking that database queries use all columns in the database queries; and checking that the database queries are authorized for the consumer microservice.

7. The method of claim 1, further comprising transmitting a notification to a user associated with the consumer microservice.

8. The method of claim 1, wherein parsing API definitions in the second source code further comprises identifying one or more filters associated with each API endpoint of the producer microservice, the one or more filters configured to intercept or transform the API responses transmitted from the producer microservice to the consumer microservice.

9. The method of claim 1, wherein identifying the set of fields used by the consumer microservice comprises: identifying a first subset of fields by parsing the first source code to determine which fields of the output data model are accessed by the consumer microservice after receiving the API response; identifying a second subset of fields from the log data representing fields transmitted over a network during runtime; and deduplicating and combining the first subset and the second subset to form the set of fields used by the consumer microservice.

10. The method of claim 1, wherein the report further includes one or more recommended filters for at least one of the producer microservice or the consumer microservice to avoid transmission of the unused fields, the one or more recommended filters configured to selectively include only fields used by the consumer microservice in the API responses.

11. A non-transitory computer-readable storage medium for tangibly storing instructions capable of being executed by a processor, the instructions defining steps of:

receiving a request from a user to analyze a consumer microservice;

retrieving first source code associated with the consumer microservice and second source code associated with a producer microservice;

analyzing the first source code to identify issues in the first source code;

retrieving log data generated by the consumer microservice, the log data comprising API responses transmitted from the producer microservice to the consumer microservice;

analyzing, during production, the first source code, the second source code, and the log data to identify unused fields transmitted by the producer microservice to the consumer microservice, the analyzing comprising:

parsing API definitions in the second source code to identify an output data model of one or more API endpoints of the producer microservice, the output data model defining fields returned by each API endpoint;

identifying a set of fields used by the consumer microservice by parsing the first source code to determine which fields of the output data model are accessed by the consumer microservice after receiving an API response from the producer microservice and correlating the parsed first source code with the log data; and comparing the output data model with the set of fields used by the consumer microservice to identify a set of unused fields;

automatically modifying the first source code of the consumer microservice to remove the references of the unused fields in response to the issues;

generating a report including the issues and the unused fields; and causing one of a build or deployment process to fail in response to determining that the report includes one or more issues.

12. The non-transitory computer-readable storage medium of claim 11, wherein analyzing the first source code to identify issues in the first source code comprises parsing the first source code to identify database queries and unused database queries in the first source code.

13. The non-transitory computer-readable storage medium of claim 12, wherein analyzing the first source code to identify issues in the first source code comprises transmitting the database queries and the unused database queries to a rule engine.

14. The non-transitory computer-readable storage medium of claim 13, wherein analyzing the first source code to identify issues in the first source code comprises identifying one or more rules triggered by the database queries and the unused database queries, the one or more rules including:

checking that queries only use indexed columns;

checking that queries do not use blind Cartesian products;

checking that queries perform null checks on non-nullable columns;

checking a number of the unused queries;

checking that database queries use all columns in the database queries; and checking that the database queries are authorized for the consumer microservice.

15. The non-transitory computer-readable storage medium of claim 11, the steps further comprising transmitting a notification to a user associated with the consumer microservice.

16. A device comprising:

a processor configured to:

receive a request to analyze a consumer microservice, retrieve first source code associated with the consumer microservice and second source code associated with a producer microservice, analyze the first source code to identify issues in the first source code, retrieve log data generated by the consumer microservice, the log data comprising API responses transmitted from the producer microservice to the consumer microservice, analyze, during production, the first source code, the second source code, and the log data to identify unused fields transmitted by the producer microservice to the consumer microservice, the analyzing comprising:

parsing API definitions in the second source code to identify an output data model of one or more API endpoints of the producer microservice, the output data model defining fields returned by each API endpoint;

identifying a set of fields used by the consumer microservice by parsing the first source code to determine which fields of the output data model are accessed by the consumer microservice after receiving an API response from the producer microservice and correlating the parsed first source code with the log data; and comparing the output data model with the set of fields used by the consumer microservice to identify a set of unused fields, automatically modify the first source code of the consumer microservice to remove the references of the unused fields in response to the issues;

generate a report including the issues and the unused fields, and cause one of a build or deployment process to fail in response to determining that the report includes one or more issues.

17. The device of claim 16, wherein analyzing the first source code to identify issues in the first source code comprises parsing the first source code to identify database queries and unused database queries in the first source code.

18. The device of claim 17, wherein analyzing the first source code to identify issues in the first source code comprises transmitting the database queries and the unused database queries to a rule engine.

19. The device of claim 18, wherein analyzing the first source code to identify issues in the first source code comprises identifying one or more rules triggered by the database queries and the unused database queries, the one or more rules including:

checking that queries only use indexed columns;

checking that queries do not use blind Cartesian products;

checking that queries perform null checks on non-nullable columns;

checking a number of the unused queries;

checking that database queries use all columns in the database queries; and checking that the database queries are authorized for the consumer microservice.

20. The device of claim 16, the processor further configured to transmit a notification to a user associated with the consumer microservice.

* * * * *